J. H. CHAMP.
BOTTLE FILLING MACHINE.
APPLICATION FILED OCT. 4, 1904.

956,285.

Patented Apr. 26, 1910.
12 SHEETS—SHEET 1.

J. H. CHAMP.
BOTTLE FILLING MACHINE.
APPLICATION FILED OCT. 4, 1904.

956,285.

Patented Apr. 26, 1910.
12 SHEETS—SHEET 2.

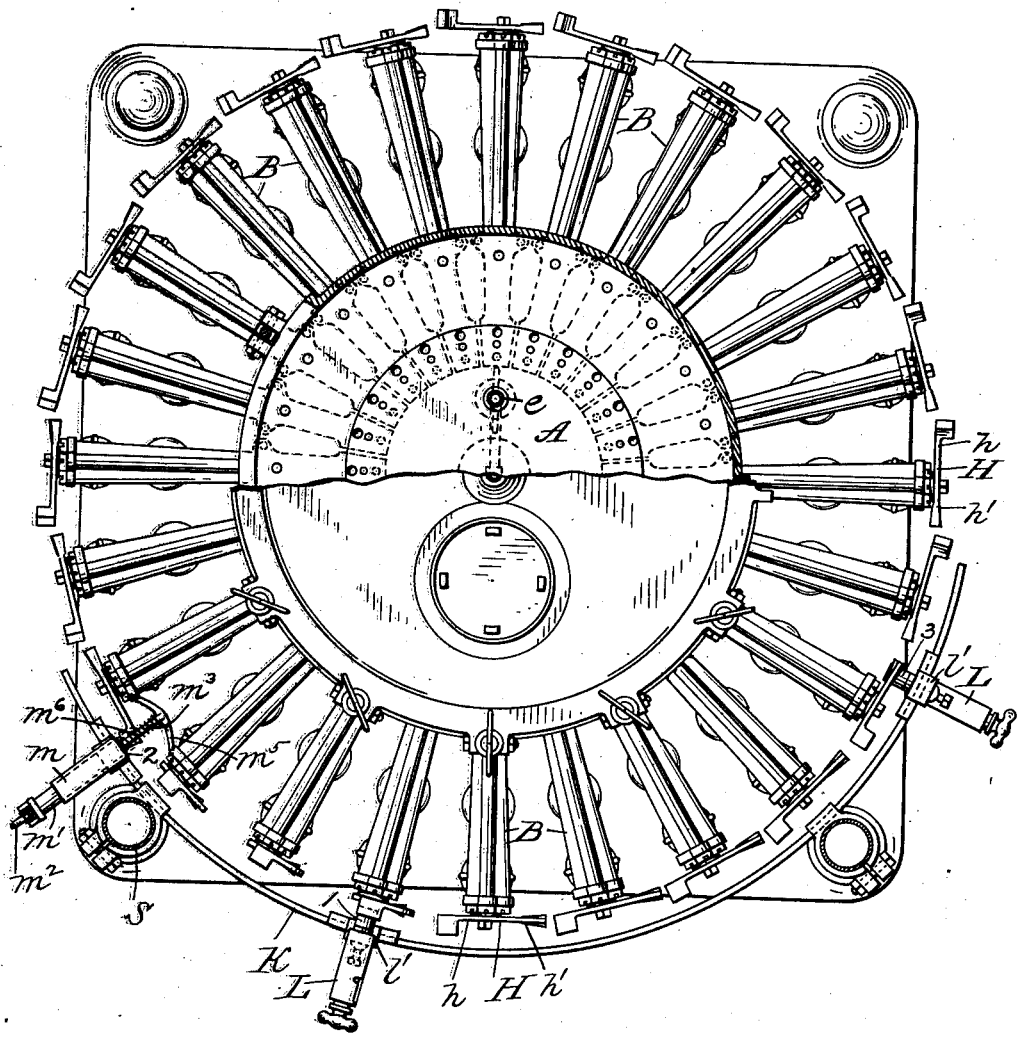

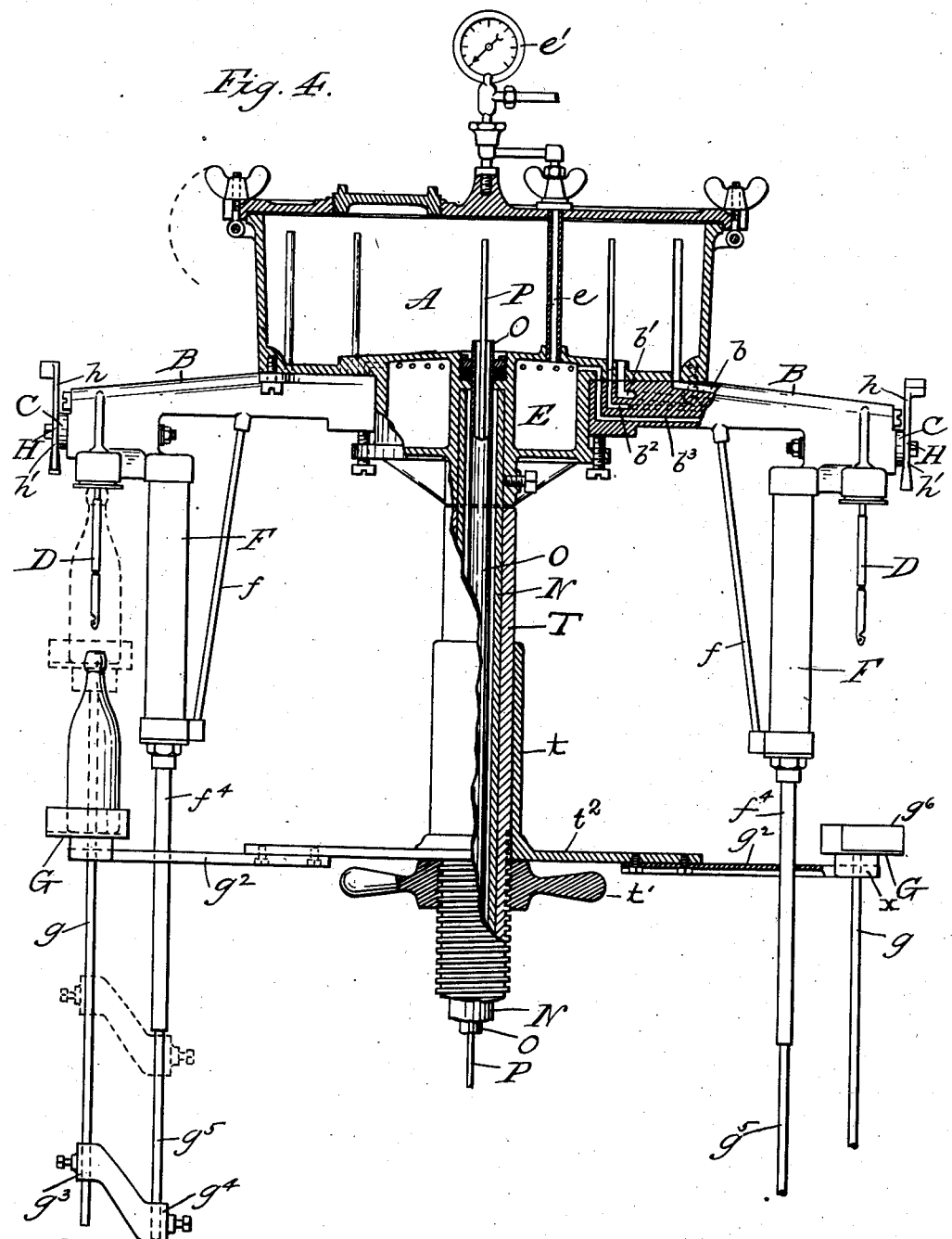

J. H. CHAMP.
BOTTLE FILLING MACHINE.
APPLICATION FILED OCT. 4, 1904.
956,285.
Patented Apr. 26, 1910.
12 SHEETS—SHEET 5.
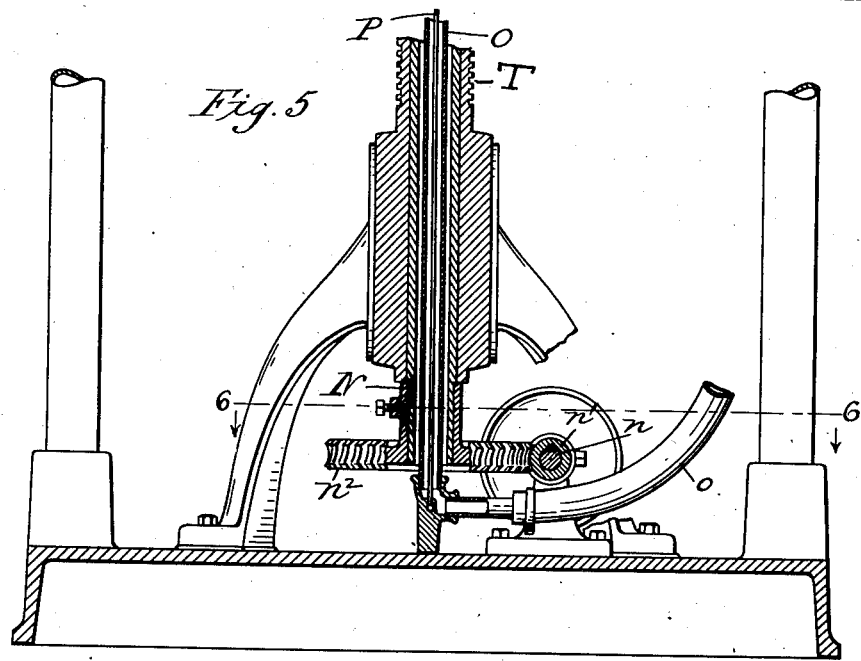
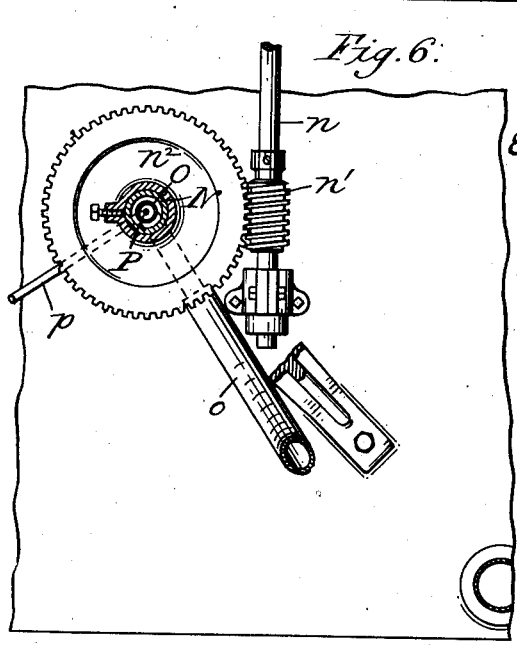
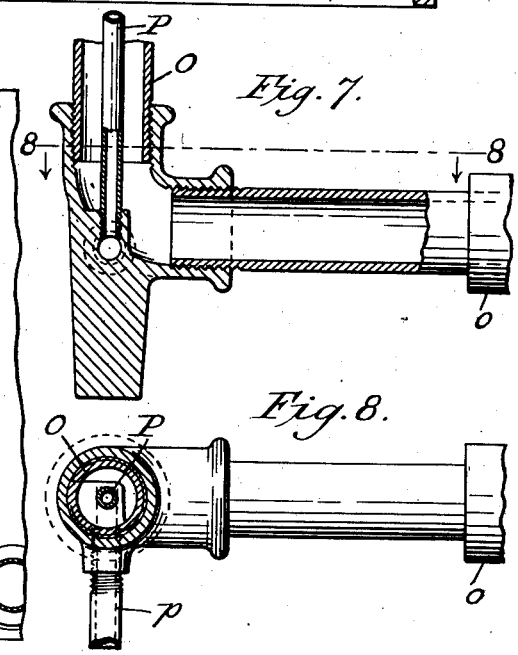
Witnesses:
A. L. Lord.
S. Davis.
Inventor.
Joseph H. Champ
by Thos. B. Hall
Attorney.

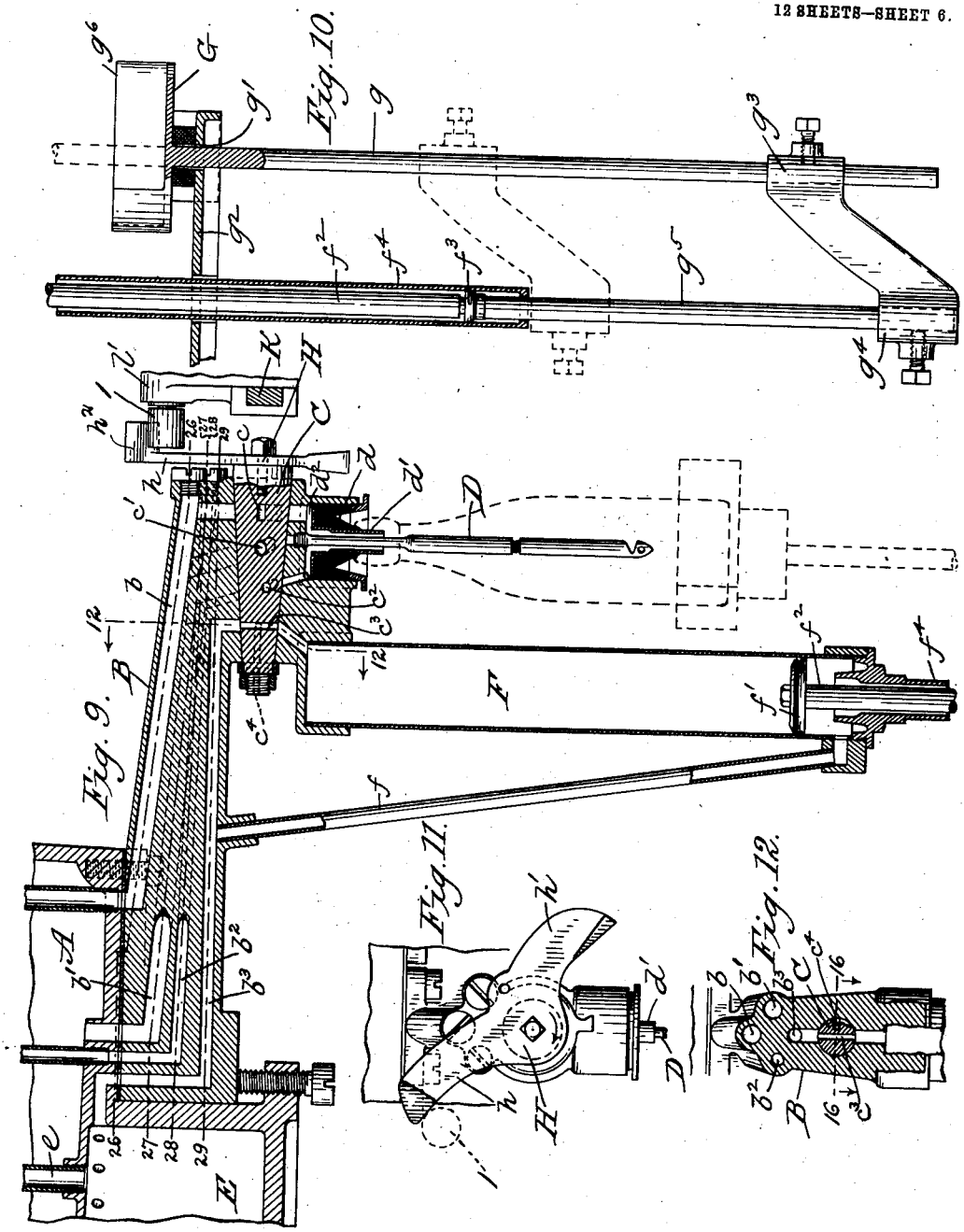

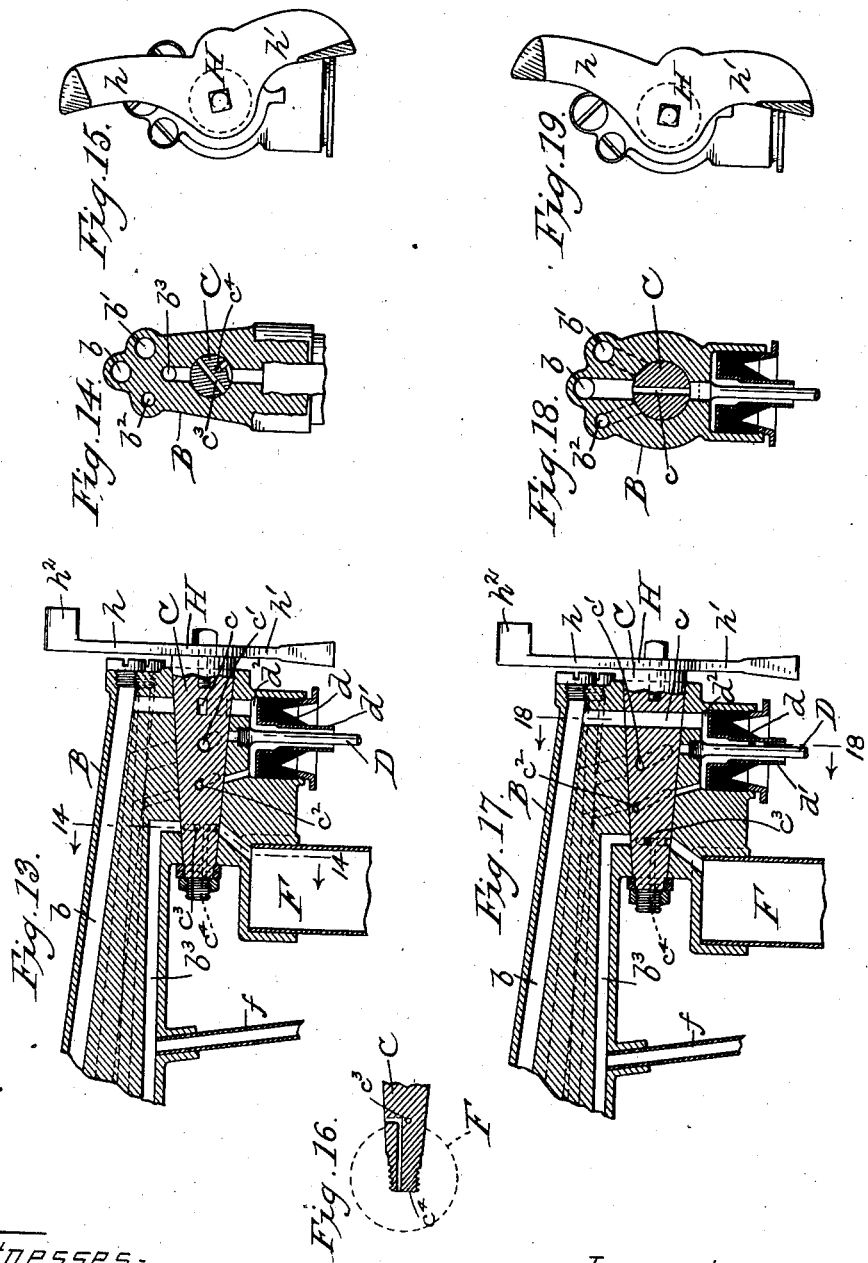

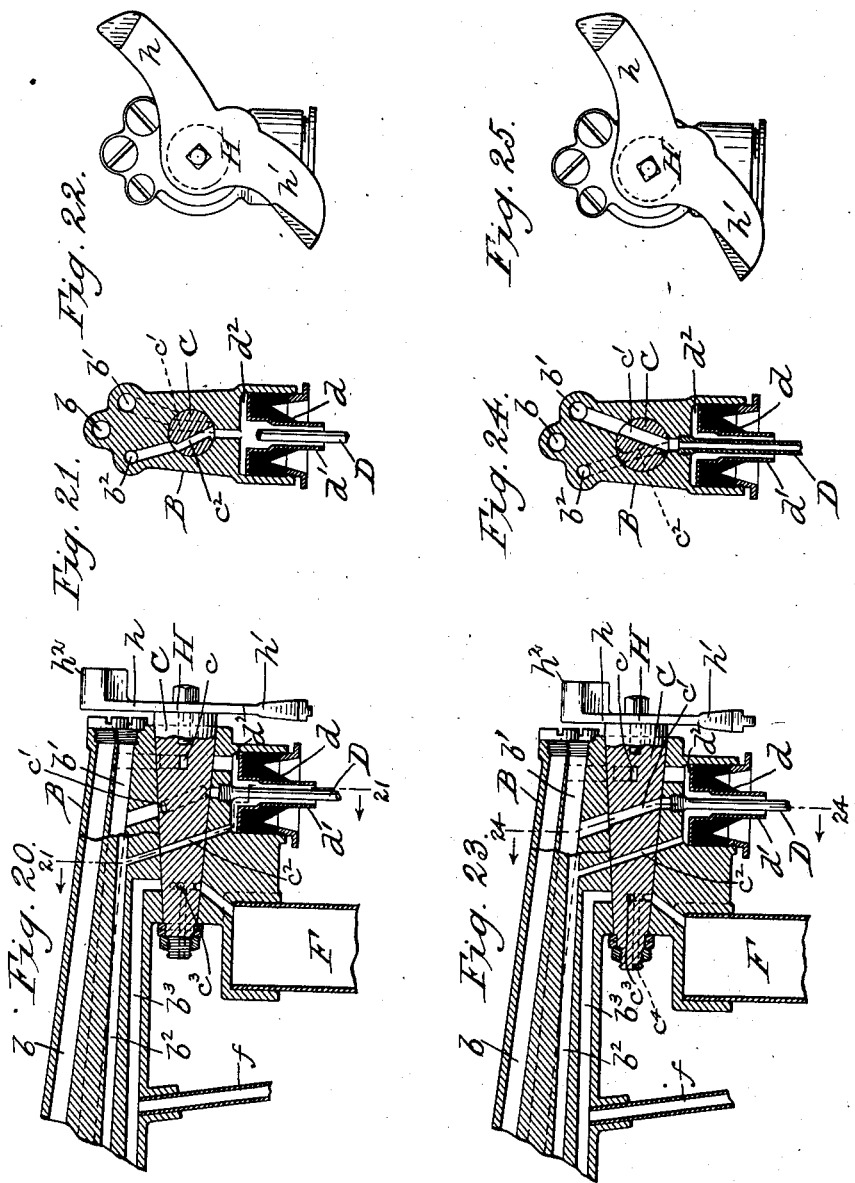

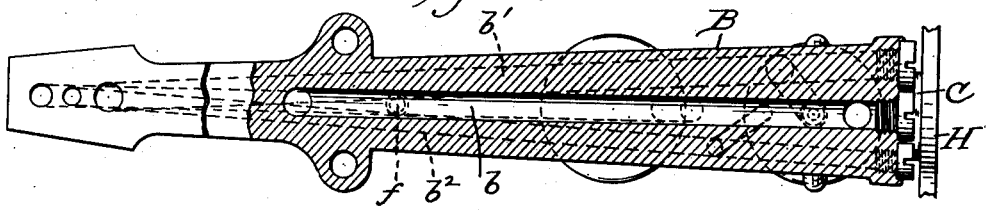
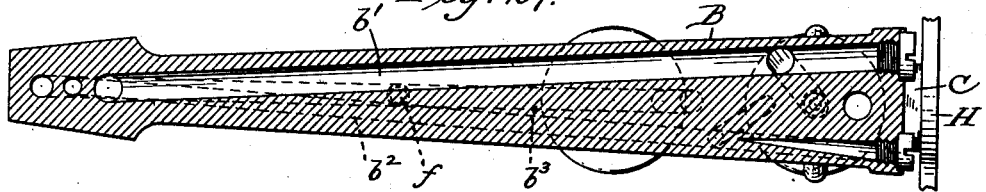
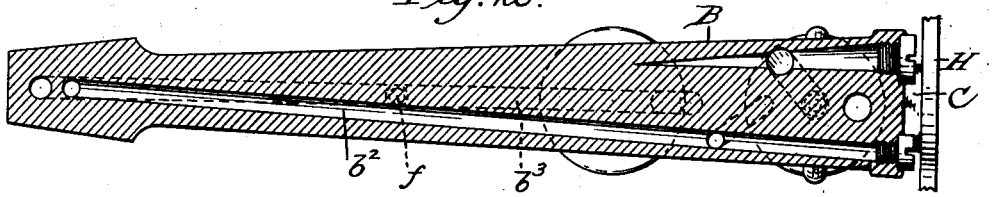
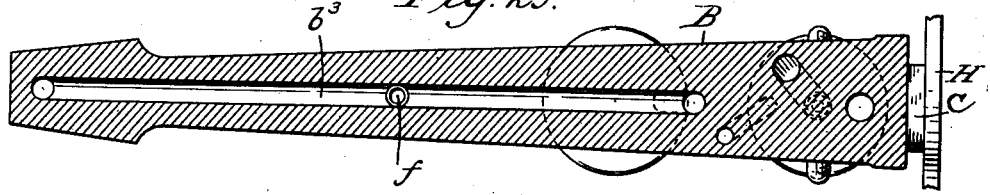

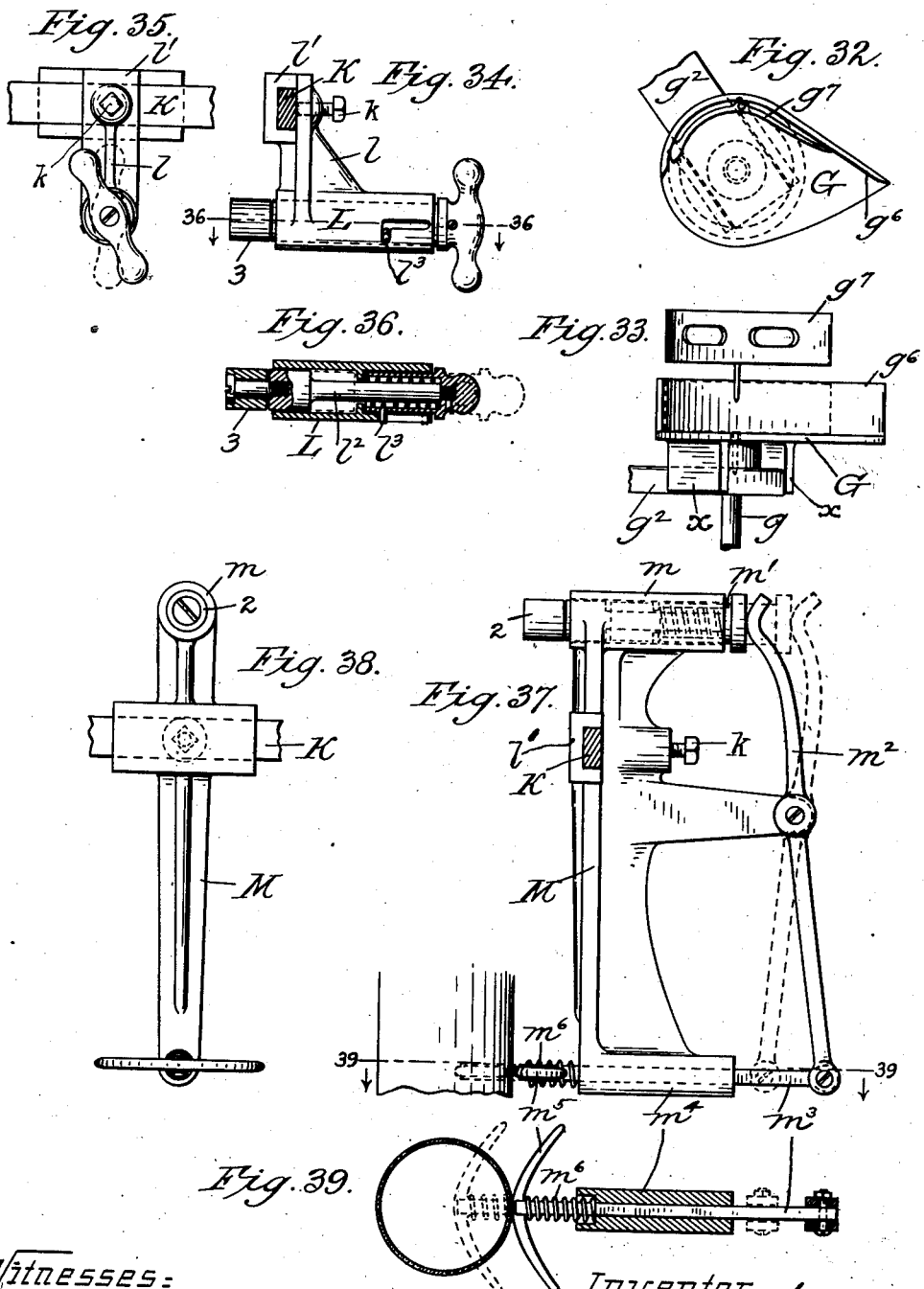

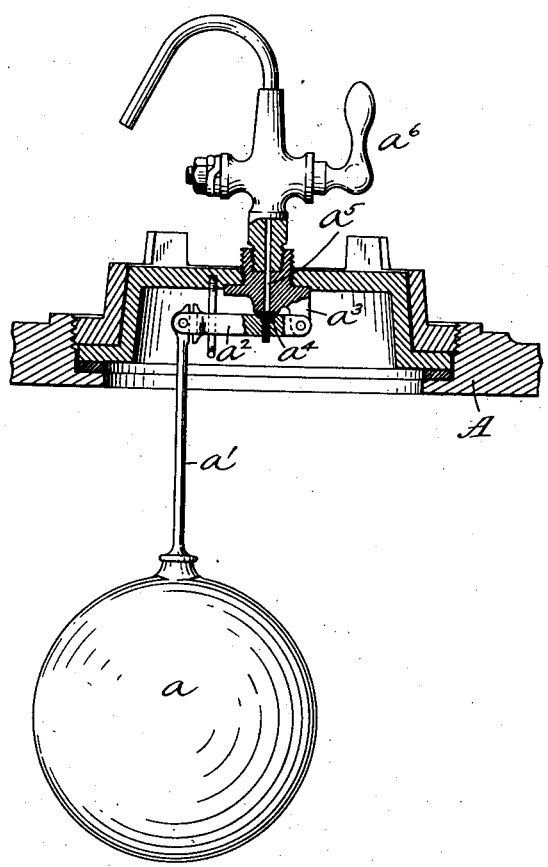

UNITED STATES PATENT OFFICE.

JOSEPH H. CHAMP, OF CLEVELAND, OHIO, ASSIGNOR TO THE BISHOP & BABCOCK COMPANY, OF CLEVELAND, OHIO, A CORPORATION OF OHIO.

BOTTLE-FILLING MACHINE.

956,285. Specification of Letters Patent. Patented Apr. 26, 1910.

Application filed October 4, 1904. Serial No. 227,152.

*To all whom it may concern:*

Be it known that I, JOSEPH H. CHAMP, a citizen of the United States, resident of Cleveland, county of Cuyahoga, and State of Ohio, have invented a new and useful Improvement in Bottle-Filling Machines, of which the following is a specification, the principle of the invention being herein explained and the best mode in which I have contemplated applying that principle, so as to distinguish it from other inventions.

The object of the invention is to provide an improved machine for filling bottles or other analogous vessels; and such invention is particularly intended for the automatic filling of bottles with beer under pressure. The invention consists of the means hereinafter described, and particularly pointed out in the claims.

The annexed drawings and the following description set forth in detail certain mechanism embodying the invention, such disclosed means constituting but one of various mechanical forms in which the principle of the invention may be used.

Figure 1:
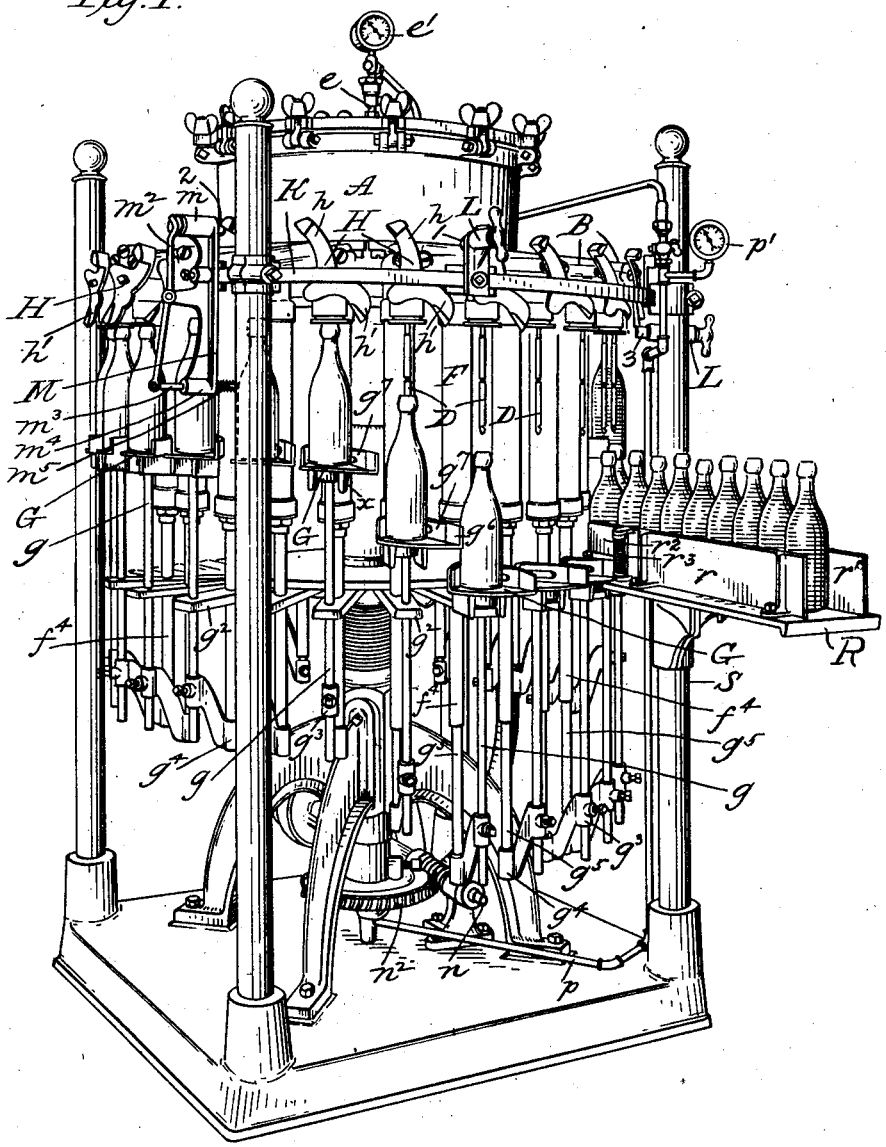
Figure 2:
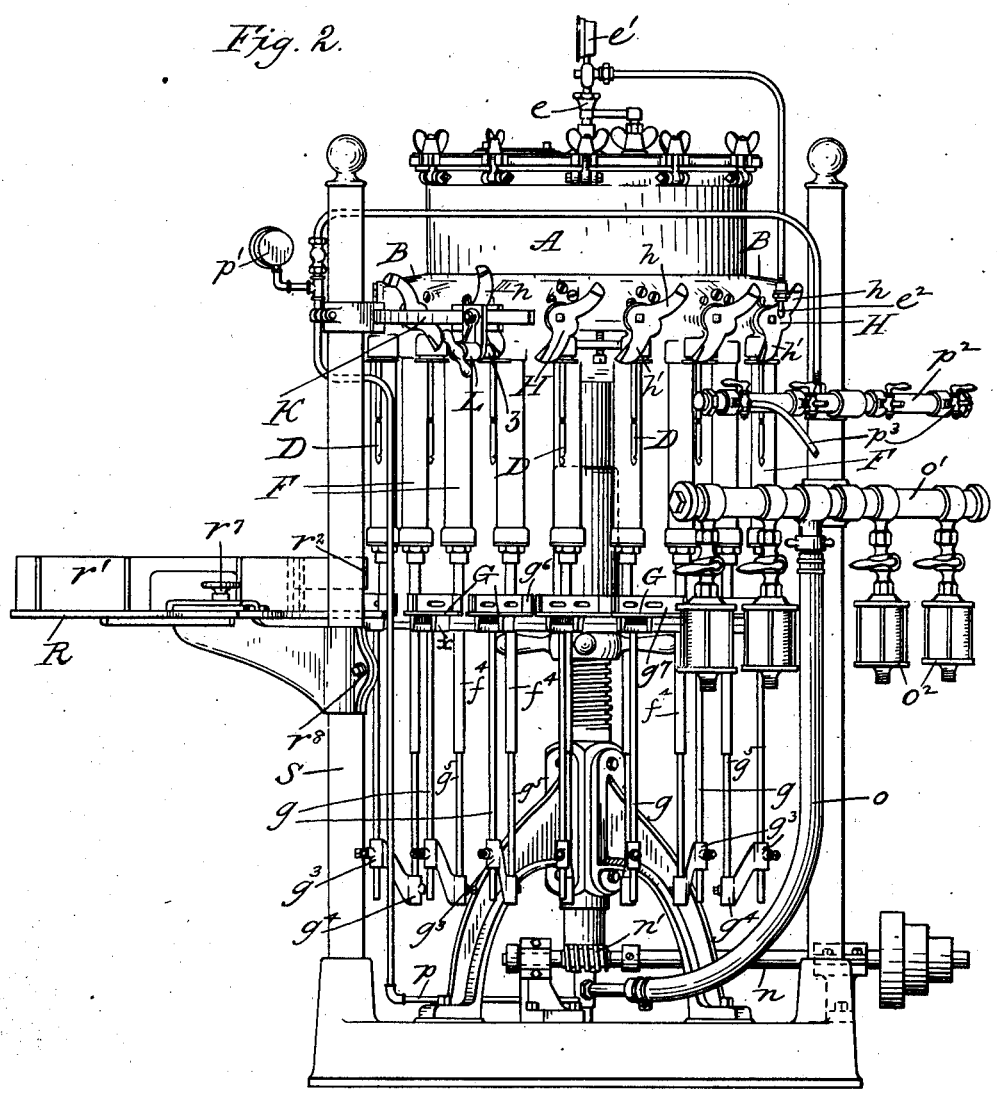
Figure 30:
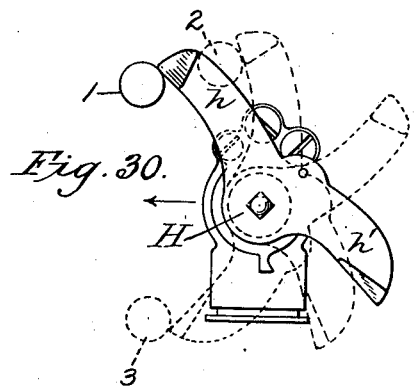
Figure 31:
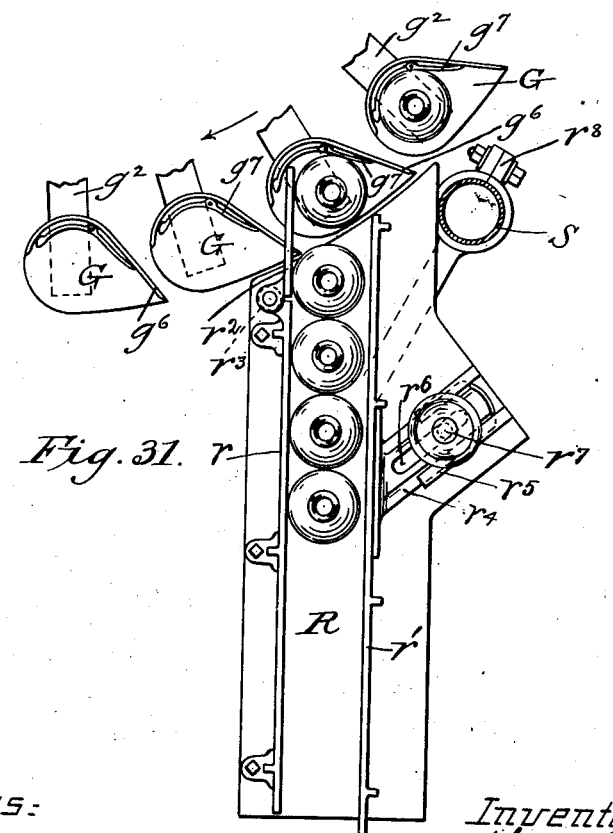

Figure 1 is a front perspective of the machine, with omission of certain construction which might confuse the construction essentially designed to be shown in this view; Fig. 2 is a side elevation of the machine, with certain construction omitted to prevent confusion; Fig. 3 is a top plan of the machine, with omission of certain construction, especially with omission of half of the beer tank lid; Fig. 4 is a view analogous to a diagrammatic representation, partly in side elevation and partly in vertical section, showing certain construction of the machine; Fig. 5 is a detail of certain lower construction of the machine, partly in side elevation and partly in vertical section; Fig. 6 is a detail top plan, on the line 6—6, Fig. 5; Fig. 7 is a detail, showing on a larger scale than in Fig. 5, the extreme lower portions of the beer inlet tube, and of the tube which supplies air above the beer in the tank; Fig. 8 is a detail sectional view on line 8—8, Fig. 7; Fig. 9 is a detail view, mainly in vertical section, of one radial formation projecting from the lower portion of the beer tank, and the construction carried by such radial formation, the members being shown in position immediately before a rocker device carried by such formation is operated by the first roller; Fig. 10 is a detail view partly in side elevation and partly in vertical elevation, showing a bottle rest and the lower portion of the mechanism for raising and lowering such bottle rest; Fig. 11 is a detail view, in front and elevation, of the radial formation shown in Fig. 9, with its accompanying construction; Fig. 12 is a transverse section on the line 12—12, Fig. 9; Fig. 13 is a detail view, mainly in vertical section, of the outer portion of said radial formation and its accompanying construction, the members being shown in their position immediately after the rock device has been operated by the first roller; Fig. 14 is a transverse section on the line 14—14, Fig. 13; Fig. 15 is a front elevation of Fig. 13, designed to show the face view of the rock device when in the position represented in Fig. 13; Fig. 16 is a transversely sectioned detail of the rear end of the valve plug, on line 16—16, Fig. 12; Fig. 17 is a view similar to Fig. 13, but showing the members in the first position which they assume by the engagement of the rock device with the second roller; Fig. 18 is a transverse section on the line 18—18, Fig. 17; Fig. 19 is a front elevation of Fig. 17; Fig. 20 is a view similar to Figs. 13 and 17, but showing the members in the second position which they assume by engagement of the rock device with the second roller; Fig. 21 is a transverse section on the line 21—21, Fig. 20; Fig. 22 is a front end elevation of Fig. 20; Fig. 23 is a view similar to Figs. 13, 17 and 20, but showing the members in their third and last position caused by engagement of the rock device with the second roller; Fig. 24 is a transverse section on line 24—24 of Fig. 23; Fig. 25 is a front end elevation of Fig. 23; Fig. 26 is a detail view, mainly in horizontal section, on the line 26—26, Fig. 9; Fig. 27 is a detail view, mainly in horizontal section, on line 27—27, Fig. 9; Fig. 28 is a detail view, mainly in horizontal section, on line 28—28, Fig. 9; Fig. 29 is a detail view, mainly in horizontal section, on line 29—29, Fig. 9, Fig. 30 is a detail front elevation of one of the radial formations of the beer tank, representing in full and in dotted lines respectively different operative positions of the rock device, when in engagement respectively with the three rollers; Fig. 31 is a detail view, in top plan, showing the receiving trough for the filled bottles, in conjunction with accompanying bottle rests, and means for automatically shifting the filled bottles from off their rests into said bottle receiving trough; Fig. 32 is a detail view, in top plan, of one of the bottle rests; Fig. 33 is a detail view in front elevation of Fig. 32; Fig. 34 is a detail view in side elevation of a roller, alike constructed for either the first or third rollers, the present view showing the roller depending as is the third roller; Fig. 35 is an end elevation of Fig. 34; Fig. 36 is a horizontal longitudinal section on the line 36—36, Fig. 34; Fig. 37 is a detail view, in side elevation, of the second roller. Fig. 38 is a detail view, in front end elevation of Fig. 37; Fig. 39 is a detail view, in longitudinal horizontal section, on line 39—39 of Fig. 37; and Fig. 40 is a detail view, partly in vertical section and partly in side elevation, showing the beer tank provided with one form of means for maintaining proper pressure of the beer therein.

The form of the machine shown in the drawings is adapted to operate with an indefinite number of bottles simultaneously. It will accordingly suffice for present purposes to give a detailed description of the construction and operation of the invention as embodied in means thereof for filling a single bottle with beer under pressure.

The circular beer tank A, centrally located at the top of the machine, has a series of rigid radial formations B, all like each other, rigidly secured to and projecting in a general horizontal direction, at equi-distant points about the lower portion of said tank. Each such radial formation has four independent fluid ducts or ways; a compressed air-inlet-way $b$, a beer-way $b'$, a vent-way $b^2$, and an actuating-fluid-way $b^3$. Each one of said four ways is divided into two transverse parts, an upper and a lower part, having the horizontal valve plug C located between such two parts. The compressed air-inlet way $b$ has its two transverse parts adapted to communicate with each other by intermediate registration of channel $c$ formed in said plug C. The beer-way $b'$ has its two transverse parts adapted to communicate with each other by intermediate registration of channel $c'$ formed in plug C. The vent-way $b^2$ has its two parts adapted to communicate with each other by intermediate registration of channel $c^2$ formed in plug C. The actuating fluid-way $b^3$ has its two parts adapted to communicate with each other by intermediate registration of channel $c^3$ formed in plug C.

A bottle filling tube or member D is connected to and depends from the discharge end of the lower transverse part of beer-way $b'$, such tube passing freely down through mouth-piece $d$, so as to leave a free annular space in the central tube $d'$ of such mouth piece, and the latter having an upper chamber $d^2$ that provides constant communication between the discharge ends of the lower transverse parts of air inlet $b$ and vent-way $b^2$ on the one hand, and said tube $d'$ on the other hand. A bottle, while being filled, is designed to be held closely against the mouth-piece $d$ so as to be sealed thereby. Such mouth-piece, with the several passages that communicate therewith, and the corresponding valve-plug C controlling the latter, constitute an individual bottle-filling device, or bottle-filling valve, as such device is currently designated in the art to which my invention belongs. Said compressed air inlet $b$ and said vent-way $b^2$ each has the inner end of its upper transverse part in constant communication with the upper portion of the beer tank A. Said beer way $b'$ has the inner end of its upper transverse part in constant communication with the lower portion of such tank. Said actuating fluid way $b^3$ has the inner end of its upper transverse part in constant communication with the annular actuating fluid reservoir E, located centrally below said beer-tank. Compressed actuating fluid is supplied to said reservoir by a pipe $e$ communicating with the reservoir top and provided with a gage $e'$, while it is adapted to be connected at its receiving end $e^2$ to a suitable feed device. The formation of said ways is such that the two transverse parts of air inlet-way $b$ register with channel $c$ and complete the operation resulting from such registration and pass out from said registration,—all before the two transverse parts of vent-way $b^2$ register with channel $c^2$, and also all before the two transverse parts of beer-way $b'$ register with channel $c'$; whereby the bottle is properly charged with air having the same pressure as the beer, before beer communication to the bottle is had and before vent is given to the bottle. At a point between said reservoir E and said plug C, said way $b^3$ has constant communication with the fluid-way $f$ that in turn constantly communicates with the lower portion of a vertical cylinder F depending from the radial formation B, below the lower transverse part of such way $b^3$. The lower end of the lower transverse part of way $b^3$ has constant communication with the upper end of said cylinder F. The waste way $c^4$, in the inner end of the plug C, is adapted to communicate with said lower transverse part of way $b^3$ when such plug is in certain rotative positions, and to be closed against such communication when said plug is in other certain rotative positions.

Cylinder F has a piston $f'$ working therein, always between the communications respectively of the way $f$ and the lower transverse part of way $b^3$ with the opposite ends of said cylinder. The lower face of such piston is subjected constantly to the pressure of the actuating fluid in reservoir E; while upper face of such piston is subjected to the pressure of the fluid within the said reservoir E, when plug C is turned so as to cause the two transverse parts of way $b^3$ to communicate with each other by channel $c^3$, and is subject to atmospheric pressure when plug C is turned so as to cause the lower transverse part of way $b^3$ to be in communication with the open air by waste way $c^4$.

The piston $f'$ is mounted on the upper end of a piston rod $f^2$, whose lower end is provided with a piston $f^3$ of materially less working diameter than piston $f'$. Such piston $f^3$ works within cylinder $f^4$, depending centrally down from cylinder F and of materially less diameter than such latter cylinder. The lower face of said piston $f^3$ is constantly subject to atmospheric pressure, by reason of the open end formation of such lower portion of its cylinder $f^4$, while the upper face of said piston $f^3$, is constantly subject to the pressure of the actuating fluid in reservoir E, by reason of the constantly open communication between the lower end of cylinder F and the upper end of cylinder $f^4$.

The bottles being filled are intended to be carried on rests or lifts G, Figs. 4, 32 and 33, each of which has its under-side provided with two depending lips $x$, respectively located free from and on opposite sides of a stem $g$ that extends in the line of horizontal travel of such rest; such lips having a horizontal space between them equal to the width of a horizontal bar $q^2$, and being adapted to have lateral bearing respectively against the front and rear edges of such bar, the latter serving as a support for the rest when in normal depressed position, as will be later herein explained. The stem $g$ of the rest passes through a hole $g'$ in the outer end of the bar $q^2$, and the lower end portion of the stem is adjustably secured in a sleeve $q^3$ that is, in turn, secured in vertically adjustable position on a rod $q^5$ depending from the piston $f^3$ and longitudinally sliding through the open lower end of cylinder $f^4$.

The outer end of each valve plug C is provided with an angular rocker device H, adapted to be fastened thereto in desired adjusted position so that such valve and its said device may necessarily turn together in all horizontal rocking movement about the longitudinal axis of the valve. Such device H has an upper arm $h$ and a lower arm $h'$, both projecting right angularly from the longitudinal axis of the valve but in opposite directions.

Upper arm $h$ of the rocker is provided at its upper and free portion with an outwardly projecting horizontal lug $h^2$, and a roller 1, (Figs. 9 and 30) located in a suitable frame L higher than the valve C, lies in the circular path of horizontal movement of said lug $h^2$, when such roller is in locked position nearest to the vertical center of the machine, the disposition and construction of such coöperating members being such that at no time is there any engagement between roller 1 and said arm $h$, except as roller 1 engages with lug $h^2$, and thereby rocks said arm $h$ upwardly and rearwardly, so as to operate said valve during the horizontal travel of the latter and of its rocker device H. Such engagement of lug $h^2$ with roller 1, as hereinafter described, serves in the operation of raising the bottle rest; after which engagement, such upper valve arm moves beyond said roller 1 the lug $h^2$ passing thereover during the continued horizontal travel of the valve and its rocker circularly around the vertical central axis of the machine. Said upper rocker arm $h$ is, in the further operation of the machine, adapted to engage with another roller 2 (Figs. 30, 37 and 38) that serves in the operation of filling the bottle. Said roller 2 is located in the path of circular horizontal travel of said lug $h^2$, so as to cause engagement between the same, whereby said arm $h$ is caused to rock upwardly and rearwardly, as hereinafter described; after which, said arm passes said roller 2, by said lug $h^2$ passing under the latter.

The lower arm $h'$ of the valve is adapted to engage with roller 3, as hereinafter described, to close communication between the beer tank and the bottle mouth piece, and also to lower the bottle rest. Such roller 3 is located lower than said valve, and in the path of circular horizontal travel of said depending arm $h'$; and is adapted to engage with the latter so as to rock it upwardly and rearwardly. After thus operating said valve, the depending arm $h'$ passes over said roller 3,—all during the said horizontal travel of the valve and rocker. The supporting frame for roller 3 is a substantial duplicate of that of roller 1, referred to above; except that the frame of roller 1 projects vertically upward from bar K, while the frame of roller 3 depends vertically from such bar. Each such roller frame consists of a horizontal barrel L, having a web $l$ rigidly connecting it with means for fastening the same to said bar K, as shown in Figs. 34, 35 and 36. Each roller, 1 and 3, is adjustably fastened to a stem $l^2$, slidable in said barrel and having a spring pressed locking device $l^3$ adapted to maintain the stem outside of said barrel. The unlocking of such spring pressed device $l^3$ operates to cause the roller to be withdrawn into said barrel.

Roller 2 is mounted in a frame M, Figs. 37, 38 and 39, also adapted to be fastened to the bar K. Such frame M has at its upper portion a horizontal barrel $m$ in which slides a stem $m'$, carrying said roller 2 at its inner end. Stem $m'$ is spring-pressed so as to maintain said roller within the barrel, except when such spring-pressure is overcome by a bottle on the corresponding bottle rest operating through mechanism as follows: The outer end of said stem $m'$ is adapted to be engaged in free sliding bearing by the upper arm of a vertical rock lever $m^2$, the lower arm of such lever being pivoted to the outer end of a horizontal rod $m^3$ longitudinally sliding in a sleeve $m^4$ formed in the lower portion of the frame M. The inner end of said rod $m^3$ has rigidly secured thereto a curved presser bar $m^5$, normally held away from the frame M by a spring $m^6$, and in the circular path of the bottle on the corresponding bottle rest. When such bottle engages said presser bar, the lever $m^2$ is rocked so as to cause the roller 2 to be forced into the path of the circular travel of lug $h^2$ of arm $h$. When there is no bottle on the corresponding bottle rest, the roller 2 is withdrawn by the spring $m^6$ into barrel $m$, and out of the circular path of said lug $h^2$.

Each one of the three roller frames is adapted to be moved horizontally along the bar K, to the desired point of operation of its roller, at any time; and then to be clamped at such desired point of operation by means of a collar $l'$ rigid with the roller frame, and a set screw $k$; such collar embracing said bar K and such set screw being threaded in a suitable opening of the roller frame in horizontal line with said collar, and adapted to have inner end bearing against the horizontal circular bar K. The roller of each of such three roller frames is maintained at a constant height relatively to the horizontal axis of oscillation of valve C, throughout all engagement of such roller with the corresponding arm of such valve; such engagement, furthermore, is maintained throughout to one and the same side of said rocking axis, being always higher than such axis as regards rollers 1 and 2, and being always lower than said axis as regards roller 3.

The machine is driven by a horizontal power shaft $n$, carrying worm $n'$ which meshes with worm gear wheel $n^2$ adjustably secured to the lower end of upright tubular shaft N (Figs. 1, 2, 5 and 6). To the upper end of such shaft is adjustably secured the rotary portion of the machine structure, diagrammatically represented in Fig. 4 and comprising the beer tank, the actuating compressed fluid reservoir, and the radial formations which have common circular movement with such tank and reservoir. Located centrally within, and extending longitudinally of, said tubular shaft N, so as to project beyond the same at both ends, is a beer supply tube O. The lower end of such tube O is connected by a tube $o$ with a horizontal pipe section $o'$ fastened to the stationary outer framework of the machine and forming a chamber from which depend a number of sight cups $o^2$, provided with valves, and adapted to be connected respectively with a like number of barrels containing beer under pressure. The upper end of tube O communicates with the central lower portion of beer tank A, as will appear from Fig. 4. Located longitudinally and centrally within tube O is another tube F, the upper end of which extends beyond the upper end of tube O, and into the upper central portion of tank A. Its lower end connects with tube $p$, provided with gage $p'$, and leads from a horizontal pipe section or chamber $p^2$ that has a number of valved connections $p^3$, adapted to be supplied with pressure fluid from a like number of suitable supply means, Figs. 1 and 2.

The apparatus (Figs. 1, 2 and 31) for receiving the filled bottles from the movable bottle rests G, although it has been divided out of the present case and presented in a separate application, Serial No. 549,144, filed March 14, 1910, may nevertheless be described in this connection, since it figures in the general operation of the machine. Such apparatus, then, is formed with a horizontal plate R, having thereon three bottle guides $r, r', r^2$. Guides $r$ and $r'$ are parallel with each other, and extend lengthwise of plate R; guide $r$ being nearer to the operator than is guide $r'$. Guide $r^2$ has its one end hinged to the bottle-receiving end of guide $r$; its opposite and free end extends across the vertical line of the horizontal circular path of travel of the bottle rests, and hence across the path of travel of the bottles on such rests, to insure its positive engagement with each filled bottle, on the latter's appropriate rest. A spring $r^3$ is connected to said guides $r$ and $r^2$, and is of force so proportioned to the conditions of its desired work, that it maintains said hinged guide $r^2$ normally in line with said guide $r$, but permits it under certain pressure to swing in the direction of travel of the bottle rests, toward the operator. As each filled bottle, in turn, engages with said hinged guide $r^2$, the latter, aided by vertical flange $g^6$ at the rear edge of rest G, sweeps the bottle, under normal conditions, from off such rest, and on to plate R,—between guides $r$ and $r'$, in proper discharge movement from the machine. But, in the event any bottle offers such abnormal resistance to removal from its rest as had better be spring-yielded to, than rigidly resisted, then, the hinged guide yields to the same, and swings toward the operator in the direction of travel of the bottle rest, so as to permit passage of such bottle on its rest.

The guide $r'$ is formed with rigid arm $r^4$, inclined to the line of such guide; such arm being longitudinally adjustable in a guide way $r^5$ formed on said plate R and similarly inclined to the proper longitudinal position of said guide $r'$ on said plate. Such arm $r^4$ is formed with a longitudinal slot $r^6$, in which the stem of a thumb clamp device $r^7$ fits, the lower end of such stem being screw-threaded in said plate. Such clamp device is thus adapted to secure said arm in said guide way at any desired point of relative adjustment; so that it will be seen that guide $r'$ may be adjusted both longitudinally and laterally on said plate R, by longitudinal movement of its inclined arm, according to the different sizes of the bottles being filled. Each bottle rest, moreover, is adapted to have detachably fitted thereon, inside of flange $g^6$, a device $g^7$, which equips such rest to be used for a bottle of smaller diameter than is used when said device $g^7$ is not employed, as illustrated in Figs. 32 and 33. Plate R, and with it the entire bottle-receiving apparatus just described, is secured in proper vertical adjustment on one of the uprights S of the outer and stationary frame work of the machine by a clamp device $r^8$; which uprights support the said bar K, to which the frames of the three rollers 1, 2, 3 are severally secured.

The tubular shaft N previously referred to as supporting the entire rotary portion of the machine structure is inclosed and supported by another tubular shaft T centrally mounted in the stationary machine frame, (see Figs. 4 and 5). Such central tubular support T has loosely fitted about it a sleeve $t$, whose lower portion is formed with a horizontal outwardly projecting disk $t^2$, having rigidly connected therewith a series of radial bars $g^2$ that are formed near their outer end with bearings for the stems $g$ of the corresponding bottle rests G. A hand nut $t'$ is threaded exteriorly about the lower portion of said tubular support T, and is adapted to vertically adjust such sleeve $t$ upon said support T, the vertical adjustment, thereby caused, of said bearing bars $g^2$ acting correspondingly with reference to the bottle rests G; and causing the latter to be properly supported in their normal depressed positions by such bearing bars to suit the varying lengths of bottles which may be used.

The beer tank A into which tubes O and P discharge may be provided with any suitable means for maintaining conditions of desired relative pressure of the different fluids within such tank. One form of such means is shown in Fig. 40, where said tank is shown as being provided with a ball float $a$, having upwardly an extending stem $a'$ to the upper extremity of which is pivoted the power end of a valve stem $a^2$ that is a lever of the second order and has its fulcrum end horizontally pivoted to a hanger $a^3$ on the tank top. Valve $a^4$ is located between said two pivotings of its stem, and controls communication between the upper interior portion of said tank and the escape passage $a^5$, which is further adapted to be controlled by means of a vent cock $a^6$ provided at its upper end.

In the operation of the invention, such operation being conveniently described with reference to only one bottle, the tubular shaft N should rotate so as to move the radial formation B and the bottle rest G in circular travel. The operator then stands facing the machine front, viewing the same as in Fig. 1, with the bottle receiving trough at his right and places the empty bottle upon the empty bottle rest, in its lowermost position, as such bottle rest passes before him. The upper arm $h$ of the corresponding rock device H is at such time just in front of roller 1, in the circular path of movement of such arm and the corresponding valve C, secured to and rotated by such rock device, is in the position shown in Fig. 9. The corresponding bottle rest G, in vertical line with said valve, is in its lowermost position, the depending stem of said rest being in position shown in Fig. 10. The compressed actuating fluid from reservoir E is exerting its pressure against both the upper and the under faces of piston $f'$ and against the upper face of piston $f^3$, whereby said piston $f'$ is balanced, and said piston $f^3$, by the intermediate mechanism, maintains the particular bottle rest under consideration in its lowermost position. The position at this juncture of said rock device H, relatively to roller 1, is shown in Fig. 11, while the corresponding position of the valve C, closing the waste way $c^4$ against communication with the lower transverse part of fluid way $b^3$, and maintaining such lower transverse part in communication with the upper transverse part of such fluid way, is shown in Fig. 12. However, as the valve and rock device continue their travel circularly and horizontally, the horizontal lug $h^2$ at the top of arm $h$ of said rock device H, engages with roller 1; thereby rocking said arm upwardly and rearwardly and causing partial rotation of the valve; after which, such lug $h^2$ passes over said roller 1. Such rock device H is thereby turned from its previous position, shown in Figs. 9 and 11; and is rocked into the position shown in Figs. 13 and 15. Valve C is thereby turned from its previous position as shown in Figs. 9 and 12, and is placed in the position shown in Figs. 13 and 14. The upper transverse part of fluid way $b^3$ is accordingly closed from communication with the lower transverse part; and the latter part is placed in communication with the waste way $c^4$. As a result the compressed actuating fluid in cylinder F above piston $f'$ is relieved, permitting the pressure of compressed actuating fluid against the under face of said piston to raise the piston rod $f^2$, and thus, by the intermediate mechanism, to raise the bottle rest to its uppermost position, with the mouth of the bottle pressed properly against the mouth piece $d$, as shown in dotted lines of Fig. 9,—ready for the filling operation. Thereafter, the bottle, on its appropriate rest, is carried in its circular horizontal travel, against the curved presser bar $m^5$, so as to displace the latter from the path of travel of said bottle and operate rock lever $m^2$ so as to force roller 2 into the path of circular horizontal travel of lug $h^2$. Initial engagement between said two latter members thereupon places said rock device H in position shown in Figs. 17 and 19, and rotates valve C into position shown in Figs. 17 and 18, as result of which compressed air in the upper portion of beer tank A passes into the bottle and causes the same pressure to exist in the bottle as exists in such tank. Further engagement of said lug $h^2$ with roller 2 rotates the rock device H into position shown in Figs. 20 and 22; and rotates the valve C into position shown in Figs. 20 and 21. In this latter position of the valve, the air inlet way $b$ is closed from communication with the bottle; while the vent-way $b^2$ is placed in open communication with the bottle. Still further engagement of said lug $h^2$ with roller 2 then takes place, rotating rock device H into position shown in Figs. 23 and 25, and rotating the valve C into the position shown in Figs. 23 and 24, whereby the beer tank is placed in communication with the bottle by beer way $b'$ and channel $c'$, while the open communication of way $b^2$ and channel $c^2$ previously stated is still maintained. In this condition of parts, the bottle is permitted to be filled with beer, solely by its gravity flow, while the air, or gas, or foam displaced from such bottle passes through said vent way $b^2$ into the upper portion of the beer tank A. During the progress of this latter liquid filling operation, the bottle is carried around to the opposite side of the machine, where the lower arm $h'$ of the rock device H is engaged by roller 3, rocking such device H into the position shown in Figs. 9 and 11; and rocking the valve C into the position shown in Figs. 9 and 12. Accordingly all communication is now closed between the beer tank and the bottle and waste way $c^4$ of the plug is likewise closed from communication with the lower transverse part of fluid $b^3$, while plug channel $c^3$ is brought to register with the intervening transverse parts of the actuating fluid way $b^3$. Thereby, all further inlet or outlet relative to the bottle contents is prevented, and the filled bottle is in condition to be lowered from its upper position against the mouth piece. The piston $f'$, having its upper and lower faces balanced by like pressure of the actuating fluid, the pressure of such actuating fluid against the upper face of piston $f^3$ carries the bottle rest into its lowermost position, as indicated in full lines in Figs. 4 and 10. Such lowering of the rest, however, and of the filled bottle thereon, it will be understood is accomplished easily and gently by the means just described and with a minimum of jar and shock, which require to be sedulously avoided in the handling of the beverage in question, otherwise foaming and loss of contents results. The filled bottle is thereby placed entirely below, and out of horizontal line with the filling tube D. It is then carried on the still horizontally traveling rest into suitable proximity with the bottle receiving plate R, and there engaged by the spring guide $r^2$, being embraced between the latter and the upright flange $g^6$ of its rest. Should any filled bottle present abnormal resistance to removal from its rest, such as had better not be further opposed; then, the spring arm moves from out the path of travel of such filled bottle and permits the latter to pass. But, if a filled bottle offers usual resistance, only such as may be well overcome by said spring arm, it is thereupon swept from off its rest, and is received on said plate R. The filled bottle last previously delivered on such plate, is thereupon pushed along on the latter by the one now delivered, while the bottle rest last emptied, is ready for a repetition of the foregoing described operation. While such operation, described with reference to one selected bottle rest and associated parts, constituting one bottle-filling device or bottle-filling valve, has been carried on, a like operation of the other rests and corresponding sets of parts composing the remaining bottle filling valves of the machine, is of course in progress, successive rests being presented to the operator to receive empty bottles and discharging such bottles, after they have been filled, onto the receiving apparatus.

The entire operation, save for the placing of the bottles onto the bottle rests, it will further be noted, is automatic in character; not only the filling of the bottle with the beer, but also the preliminary charging of the same with the compressed gas, so as to create the desired counter-pressure, is automatically controlled by the engagement of the rocker, operating the filling valve, with successive rollers of the series secured to bar K. Such rocker and the parts thus operatively connected therewith, taken in conjunction with these rollers, constitute two part means, one part—the rocker—traveling, and the other part—the rollers and their support—not traveling, with the filling device, or valve, which together with the associated fluid-actuated bottle rest, have a conjoint travel about the axis of the machine distinct from the bottle rest movement. These same two-part means, moreover, are automatically coöperative during such conjoint travel of filling valve and bottle rest, or lift, as it may be termed, to control the supply of fluid to the fluid actuated means that raise and lower said rest.

The invention may obviously be used to fill any suitable vessels; accordingly wherever the term "bottle" occurs in the foregoing description or the following claims, the same should be understood as including, under the rule of equivalents, any suitable vessel, as a known substitute for a bottle. Similarly the invention may be used to bottle any suitable fluid; so that wherever the term "beer" occurs in the foregoing description or the following claims, the same should be understod as including, under the rule of equivalents, any suitable fluid, as a known substitute for beer.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a bottle filling machine, the combination of a rotatable upright shaft, a tank carried by said shaft, a series of bottle filling valves connected to said tank, a series of fluid pressure bottle lifts carried by said shaft, and means for automatically operating said bottle lifts by said fluid pressure during the rotation of the shaft.

2. In a bottle filling machine, the combination of a bottle mouth piece, a bottle rest, fluid actuated means for moving said bottle rest relatively to said mouth piece, said members having conjoint travel distinct from said bottle rest movement, two part means one part traveling and the other part not traveling with said distinct travel and automatically coöperative during same to control flow of fluid for said fluid actuated means, substantially as set forth.

3. In a bottle filling machine, the combination of a bottle mouth piece, a bottle rest, piston means for moving said bottle rest toward said mouth piece, said members having conjoint travel distinct from said bottle rest movement, two part means one part sharing and the other part not sharing in said conjoint travel and controlling flow of fluid to move said bottle rest toward said mouth piece, substantially as set forth.

4. In a bottle filling machine, the combination of a depending bottle filling member rotatably mounted with respect to a vertical axis; a corresponding fluid pressure bottle lift similarly mounted with respect to such axis; a beer tank; a compressed air tank; ducts connecting said beer tank and said air tank with said filling member and lift, respectively; and means for automatically opening and closing said ducts incidentally to the rotation of said member and lift about their common axis.

5. In a bottle filling machine, the combination of a series of relatively fixed depending bottle filling members rotatably mounted with respect to a common vertical axis; a corresponding series of fluid pressure bottle lifts similarly rotatably mounted with respect to such axis; a beer tank; a compressed air tank; ducts connecting said beer tank and said air tank with said filling members and lifts, respectively; and means for automatically successively opening and closing said ducts incidentally to the rotation of said members and lifts about their common axis.

6. In a bottle filling machine, the combination of a bottle mouth-piece; a bottle rest; piston means for moving said bottle rest relatively to said mouth piece; said mouth piece, bottle rest, and piston means being rotatably mounted with respect to a common axis; an actuating-fluid reservoir; a bottle-filling-fluid tank; and means for automatically connecting said piston means with said actuating-fluid reservoir and said bottle mouth piece with said bottle-filling-fluid tank, respectively, during the rotation of aforesaid members about such common axis.

7. In a bottle filling machine, the combination of a bottle mouth piece; a bottle rest; piston means for moving said bottle rest relatively to said mouth piece; said mouth piece, bottle rest, and piston means being rotatably mounted with respect to a common vertical axis; an actuating-fluid reservoir; a bottle-filling-fluid tank; and two-part means, one part rotating and the other part not rotating with aforesaid members about such common axis, and automatically coöperative during such rotation to connect said piston means with said actuating-fluid reservoir and said bottle mouth piece with said bottle-filling-fluid tank, respectively.

8. In a bottle filling machine, the combination of a series of bottle mouth pieces rotatably mounted with respect to a common vertical axis; a corresponding series of bottle rests, and a piston means for raising said bottle rests toward said mouth pieces, all similarly rotatably mounted with respect to such axis; a beer tank; a compressed air tank; and two-part means, one part rotating and the other part not rotating with aforesaid members about such common axis, and automatically coöperative incidentally to such rotation to connect successive piston means with said compressed air tank and corresponding bottle mouth pieces with said beer tank, respectively.

9. In a bottle filling machine, the combination of a bottle mouth piece; a bottle rest; piston means for moving said bottle rest relatively to said mouth piece; valve means for said piston means, said members having conjoint travel distinct from said bottle rest movement; and means not having said travel and adapted to automatically coöperate during same with said valve means to control flow of fluid for said piston means.

10. In a bottle filling machine, the combination of a bottle mouth piece; a bottle rest; piston means for moving said bottle rest away from said mouth piece, said members having conjoint travel distinct from said bottle rest movement; and two-part means, one part sharing and the other part not sharing in said distinct travel and controlling flow of fluid to move said bottle rest away from said mouth piece.

11. In a bottle filling machine, the combination of a bottle mouth piece; a bottle rest; piston means for moving said bottle rest relatively to said mouth piece; an actuating fluid reservoir; valve means between the latter and said piston means, all said members having conjoint travel distinct from said bottle rest movement; and means not having said travel and adapted to automatically coöperate during same with said valve means to control fluid communication between said reservoir and said piston means.

12. In a bottle filling machine, the combination of a bottle mouth piece; a bottle rest; piston means for moving said bottle rest relatively to said mouth piece; valve means for said piston means and said mouth piece, said members having conjoint travel distinct from said bottle rest movement; and means not having said travel and adapted to automatically coöperate during same with said valve means to control flow of fluid for said piston means and said mouth piece.

13. In a bottle filling machine, the combination of a bottle mouth piece; a bottle rest; piston means for moving said bottle rest relatively to said mouth piece; an actuating fluid reservoir, a bottle filling fluid tank; valve means controlling connection between said reservoir and said piston means and between said tank and said mouth piece, all said members having conjoint travel distinct from said bottle rest movement; and means not having said travel and adapted to automatically coöperate during same with said valve means to control fluid communication between said reservoir and said piston means and between said tank and said mouth piece.

14. In a bottle filling machine, the combination of a rotatable upright shaft; a tank carried by said shaft; a series of bottle filling valves connected to said tank; a series of fluid pressure bottle lifts carried by said shaft; and means for automatically operating said bottle lifts by said fluid pressure during the rotation of said shaft, said means being adjustable to effect such operation at a selected point in the course of such rotation.

15. In a bottle filling machine, the combination of a bottle mouth piece; a bottle rest; fluid actuated means for moving said bottle rest relatively to said mouth piece; said members having conjoint travel distinct from said bottle rest movement; and two-part means, one part traveling and the other part not traveling with said distinct travel and automatically coöperative during same to control flow of fluid for said fluid actuated means, the part of said means not thus traveling being adjustable to thus coöperate with the other part at a selected point in the course of the latter's travel.

16. In a bottle filling machine, the combination of a bottle mouth piece; a bottle rest; piston means for moving said bottle rest toward said mouth piece, said members having conjoint travel distinct from said bottle rest movement; and two-part means, one part sharing and the other part not sharing in said conjoint travel and controlling flow of fluid to move said bottle rest toward said mouth piece, the part of said means not sharing in travel being adjustable to permit such flow at a selected point in the other part's travel.

17. In a bottle filling machine, the combination of a depending bottle filling member rotatably mounted with respect to a vertical axis; a corresponding fluid pressure bottle lift similarly mounted with respect to such axis; a beer tank; a compressed air tank; ducts connecting said beer tank and said air tank with said filling member and lift, respectively; and means for automatically opening and closing said ducts incidentally to the rotation of said member and lift about their common axis, said means being adjustable to effect such opening and closing at selected points in the course of such rotation.

18. In a bottle filling machine, the combination of a series of relatively fixed depending bottle filling members rotatably mounted with respect to a common vertical axis; a corresponding series of fluid pressure bottle lifts similarly rotatably mounted with respect to such axis; a beer tank; a compressed air tank; ducts connecting said beer tank and said air tank with said filling members and lifts, respectively; and means for automatically and successively opening and closing said ducts incidentally to the rotation of said members and lifts about their common axis, said means being adjustable to effect such opening and closing at selected points in the course of such rotation.

19. In a bottle filling machine, the combination of a bottle mouth piece; a bottle rest; piston means for moving said bottle rest relatively to said mouth piece; said mouth piece, bottle rest, and piston means being rotatably mounted with respect to a common axis; an actuating-fluid reservoir; a bottle-filling-fluid tank; and means for automatically connecting said piston means with said actuating-fluid reservoir and said bottle mouth piece with said bottle-filling-fluid tank, respectively, during the rotation of aforesaid members about such common axis, said means being adjustable to effect such connection at selected points in the course of such rotation.

20. In a bottle filling machine, the combination of a bottle mouth piece; a bottle rest; piston means for moving said bottle rest relatively to said mouth piece; said mouth piece, bottle rest, and piston means being rotatably mounted with respect to a common vertical axis; an actuating-fluid reservoir; a bottle-filling-fluid tank; and two-part means, one part rotating and the other part not rotating with aforesaid members about such common axis, and automatically coöperative during such rotation to connect said piston means with said actuating-fluid reservoir and said bottle mouth piece with said bottle-filling-fluid tank, respectively, the part of said means not thus rotating being adjustable to thus coöperate with the other part at selected points in the latter's rotation.

21. In a bottle filling machine, the combination of a series of bottle mouth pieces rotatably mounted with respect to a common vertical axis; a corresponding series of bottle rests, and of piston means for raising said bottle rests toward said mouth pieces, all similarly rotatably mounted with respect to such axis; a beer tank; a compressed air tank; and two-part means, one part rotating and the other part not rotating with aforesaid members about such common axis, and automatically coöperative incidentally to such rotation to connect successive piston means with said compressed air tank and corresponding bottle mouth pieces with said beer tank, respectively, the part of said means not thus rotating being adjustable to thus coöperate with the other part at selected points in the latter's rotation.

22. In a bottle filling machine, the combination of a horizontally rotating carrier; a filling valve carried thereby; and a valve operating device adjustable in a direction substantially parallel with the path of travel of said valve, whereby the latter may be operated at a selected point in such travel.

23. In a bottle filling machine, the combination of a horizontally rotating carrier having horizontal radial arms respectively provided with valves; a device not carried by said carrier and that during the latter's travel engages successively with said valves; a horizontal curvilinear bar upon which said valve engaging device is adjustable; and a clamp that fastens said valve engaging device at desired point of adjustment on said bar.

24. In a bottle filling machine, the combination of a horizontally rotating carrier; a valve carried thereby; a valve operating device not carried by said carrier and movable in radial line relatively to the latter's axis of rotation; a spring tending to maintain said valve operating device in certain position relative to said axis; and a lock adapted to maintain said valve operating device out of said position.

25. In a bottle filling machine, the combination of a horizontally traveling carrier; a horizontally rocking valve carried thereby and having an upwardly extending projection and a downwardly extending projection; and three projection-engaging devices not carried by said carrier, one of said engaging devices being adapted to engage said upwardly extending projection higher than the rocking axis of said valve throughout its entire operation of the latter and rock said projection rearwardly and thereafter permit it to horizontally pass, one of the remaining said engaging devices being adapted to engage said upwardly extending projection higher than the rocking axis of said valve throughout its entire operation of the latter and rock said projection rearwardly and downwardly and then permit it to pass under same, and the remaining one of said engaging devices being adapted to engage said downwardly extending projection lower than the rocking axis of said valve throughout its entire operation of the latter and rock said projection rearwardly and upwardly and then permit it to pass over same.

26. In a bottle filling machine, the combination of a horizontally rotating carrier; a horizontally rocking valve carried thereby and having an arm parallel with the latter's axis of rotation and provided with a lug radial to such axis; and a device not carried by said carrier and that engages said lug to one and the same side of said axis throughout its entire operation of said valve and rocks said arm rearwardly and then permits it to horizontally pass with said lug not engaging said engaging device.

27. In a bottle filling machine, the combination of a horizontally rotating carrier; a horizontally rocking valve carried thereby and having an upwardly extending arm parallel with the latter's axis of rotation and provided with a horizontal lug projecting away from such axis; and a device not carried by said carrier and that engages said lug higher than the rocking axis of said valve throughout its entire operation of the latter and rocks said arm rearwardly and upwardly and then permits it to horizontally pass with said lug passing over said engaging device.

28. In a bottle filling machine, the combination of a horizontally traveling carrier; a horizontally rocking valve carried thereby and having an upwardly extending arm provided with a horizontal lug; and two valve-operating devices not carried by said carrier, one of said valve-operating devices being adapted to engage said lug and rock said arm rearwardly and upwardly and thereafter permit it to horizontally pass with said lug passing over same, and said other valve-operating device being adapted to engage said arm and rock it rearwardly and downwardly and thereafter permit it to pass under same.

29. In a bottle filling machine, the combination of a horizontally rotating carrier; a horizontally rocking valve carried thereby and having an upwardly extending arm parallel with the latter's axis of rotation and provided with a horizontal lug radially projecting away from said axis; and two devices not carried by said carrier and adapted to engage said lug respectively at different points in the travel of such carrier, one of said two lug-engaging devices adapted to rock said arm rearwardly and upwardly and then permit it to horizontally pass with said lug passing over same, said other lug-engaging device adapted to rock said arm rearwardly and downwardly and then permit it to pass with said lug passing under same.

30. In a bottle filling machine, the combination of a horizontally traveling carrier; a horizontally rocking valve carried thereby and provided with an upwardly extending arm having a horizontal lug and also provided with a depending arm; and two valve-operating devices not carried by said carrier, one of said valve-operating devices being adapted to engage said lug and rock said lug arm rearwardly and upwardly and thereafter permit it to horizontally pass with said lug passing over same, and said other valve-operating device being adapted to engage said depending arm and rock it rearwardly and upwardly and thereafter permit it to pass over same.

31. In a bottle filling machine, the combination of a horizontal rotating carrier; a horizontally rocking valve carried thereby, said valve having an upper arm provided with a horizontal lug and also having a lower arm; and three valve-operating devices not carried by said carrier, one of said valve-operating devices being adapted to engage said lug higher than the rocking axis of said valve throughout its entire operation of the latter and thereby rock said lug arm rearwardly and upwardly and thereafter permit it to horizontally pass with said lug passing over same, one of the remaining said valve-operating devices being adapted to engage said upper arm higher than the rocking axis of said valve throughout its entire operation of the latter and rock said arm rearwardly and upwardly and thereafter permit it to pass under same, and the remaining one of said valve operating devices being adapted to engage said lower arm lower than the rocking axis of said valve throughout its entire operation of the latter and rock said arm rearwardly and upwardly and thereafter permit it to pass over same.

32. In a bottle filling machine, the combination of a laterally traveling bottle rest; a bottle filling valve having such travel with said bottle rest; and a device not having such travel with said bottle rest and valve and adapted to be operated by a bottle on said bottle rest to operate said valve.

33. In a bottle filling machine, the combination of a laterally traveling bottle rest; a bottle filling valve having such travel with said bottle rest and provided with an operating projection; and a device not traveling with a bottle on said rest and adapted to be engaged by such bottle to operate said projection, said bottle-engaging device being adapted to lie in the path of travel of such bottle except when moved out of such path by the bottle.

34. In a bottle filling machine, the combination of a laterally traveling bottle rest; a bottle filling valve having such travel with said bottle rest and provided with an operating projection; and a device not traveling with a bottle on said rest and adapted to be operated by such bottle to operate said projection, said projection-operating device being adapted to be out of the path of travel of said projection except when moved into such path by the bottle.

35. In a bottle filling machine, the combination of a horizontally traveling bottle rest; a bottle filling valve having horizontal travel with said bottle rest; a device adapted to be engaged by a bottle on said rest; a device adapted to be engaged by said valve; and a rock lever having its opposite extremities connecting respectively with said engaging devices and the three not traveling with said horizontal travel of said bottle rest and valve.

36. In a bottle filling machine, the combination of a horizontally traveling bottle rest; a bottle filling valve having horizontal travel with said bottle rest and provided with an operating projection; a device adapted to be engaged by the side wall of a bottle on said bottle rest; a device adapted to be engaged by said projection; and a rock lever having its opposite extremities connecting respectively with said engaging devices and the three not traveling with said horizontal travel of said bottle rest and valve, said bottle-engaging device being spring-pressed into the path of travel of said bottle, and said valve-engaging device being spring-pressed out of the path of travel of said projection.

37. In a bottle filling machine, the combination of a vertically movable bottle rest having a depending stem; and a horizontal bottle rest support, such members having conjoint horizontal travel, said bottle rest provided with a depending lip located free from and to one side of said stem in vertical line crossing the path of said bottle rest support and adapted to bear horizontally against its corresponding outer edge.

38. In a bottle filling machine, the combination of a vertically movable bottle rest; and a horizontal bottle rest support, such members having conjoint horizontal travel, said bottle rest provided with a depending stem and two depending lips respectively located to opposite sides of said stem in vertical lines crossing the path of said bottle rest support and having a horizontal space between them equal to the width of said support, and said lips being adapted to have horizontal bearing respectively against the front and rear outer edges of said support.

39. In a bottle filling machine, the combination of a bottle rest; two pistons of different diameters connected to said bottle rest; two cylinders of different diameters each having constant communication with actuating fluid supply permanently to one side of its piston; and valve means controlling communication of actuating fluid with one of said two cylinders to the side of its piston opposite to the side having said constant communication.

40. In a bottle filling machine, the combination of a bottle rest, two pistons of different diameters connected to said bottle rest; two cylinders of different diameters each having constant communication with actuating fluid supply permanently to one side of its piston; valve means controlling communication of actuating fluid with one of said two cylinders to the side of its piston opposite to the side having said constant communication, said members having conjoint travel; and valve-operating means not having said travel and adapted during the latter to engage said valve means.

41. In a bottle filling machine, the combination of a vertically movable bottle rest having a depending stem; an upper piston and a lower piston having a piston rod in common connected to said stem, upper and lower cylinders respectively for said pistons; one said cylinder and piston being of different diameters from said other cylinder and piston, each cylinder having constant communication with actuating fluid supply permanently to one side of its piston; a valve controlling communication of actuating fluid with one of said two cylinders to the side of its piston opposite to the side having said constant communication, said members having conjoint horizontal travel; and valve-operating means not having said travel and adapted during the latter to engage said valve.

42. In a bottle filling machine, the combination of a vertically movable bottle rest having a depending stem; a vertically traveling piston rod connected to said stem; two pistons respectively at the upper and lower ends of said piston rod; two cylinders located one above the other with their adjacent ends communicating with each other and also with a constantly open actuating fluid passage, the upper cylinder and piston being of greater diameter than the lower cylinder and piston; a valve controlling flow of actuating fluid to the upper end of said upper cylinder, said members having conjoint horizontal travel; and valve-operating means not having said travel and adapted during the latter to engage said valve.

Signed by me, this 3rd day of October, 1904.

JOSEPH H. CHAMP.

Attested by—
 D. T. DAVIES,
 ALBERT J. WEATHERHEAD.